United States Patent Office 3,827,996
Patented Aug. 6, 1974

3,827,996
AQUEOUS DISPERSIONS OF VINYL ESTER POLYMERS

Aleksander Beresniewicz, Wilmington, Del., assignor to E. I. du Pont de Nemours and Company, Wilmington, Del.

No Drawing. Continuation-in-part of abandoned application Ser. No. 850,649, Aug. 15, 1969. This application July 28, 1971, Ser. No. 166,968
Int. Cl. C08f *37/18;* C09j *3/12*
U.S. Cl. 260—29.6 WB 6 Claims

ABSTRACT OF THE DISCLOSURE

Aqueous dispersions of vinyl ester polymers having a viscosity index of not greater than about 1.8, and a process for making them, are provided. Films cast from these dispersions possess good water resistance and stability. The dispersions contain as a protective colloid partially hydrolyzed polyvinyl alcohol, derived from polyvinyl acetate, having an average vinyl acetate content of 5 to 7 mole percent and consisting essentially of polyvinyl alcohol molecules essentially none of which contains more than about 16 mole percent vinyl acetate. The polyvinyl alcohol may consist of a blend of two or more polyvinyl alcohols each of which has an average polyvinyl acetate content different from the average of the blend; however, the average polyvinyl acetate content of any polyvinyl alcohol blended should not exceed about 16 mole percent.

CROSS-REFERENCE TO RELATED APPLICATION

This application is a continuation-in-part of my copending application Ser. No. 850,649, filed Aug. 15, 1969, now abandoned.

BACKGROUND OF INVENTION

Aqueous dispersions containing vinyl ester polymers, e.g., vinyl acetate polymers or copolymers, are well known and have found particular utility in adhesive applications. For such uses, it has been customary to polymerize or copolymerize vinyl acetate in an aqueous medium containing polymerization initiators and water-soluble protective colloids. Many of the problems associated with the preparation of useful dispersions have been discussed in a variety of patents, among which the following are included: U.S. Pat. 2,227,163 issued to Werner Starck and Heinrich Freudenberger on Dec. 31, 1940, U.S. Pat. 2,398,344 issued to Heny M. Collins and Mogens Kiar on Apr. 16, 1946, U.S. Pat. 2,388,600 issued to H. M. Collins on Nov. 6, 1945, U.S. Pat. 2,892,802 issued to Eugene P. Budewitz on June 30, 1959, U.S. Pat. 3,094,500 issued to Stedman C. Herman on June 18, 1963 and Canadian Pat. 812,285. As is evident from reading these patents, a major problem in providing a suitable dispersion based on a vinyl acetate polymer has centered on using the appropriate protective colloid. While, as these patents illustrate, water-soluble partially or completely hydrolyzed polyvinyl acetates have solved many of the problems associated with finding an appropriate protective colloid, there has not yet been provided a completely satisfactory vinyl acetate polymer dispersion for adhesive applications.

The most important properties which an adhesive, based on a vinyl ester polymer dispersion, should have are stability, both during and after preparation, water resistance of the adhesive after it has been deposited from the dispersion, and a satisfactory viscosity index. The first of these properties, i.e., stability, is by and large possessed by the customary vinyl ester polymer dispersions. Moreover, water resistance is generally achieved by including post-reactive ingredients in the dispersions. However, a dispersion with a satisfactory viscosity index, while being stable and giving water-resistant films has been lacking.

The viscosity index is the ratio of the Brookfield viscosity of the dispersion measured at 6 r.p.m. to the Brookfield viscosity of the dispersion measured at 60 r.p.m. An ideal viscosity index is "1." Such an index evidences the fact that the viscosity of the dispersion is independent of shear rate. For practical purposes, the viscosity index is important since, during application of the adhesive dispersion by customary application machines, the dispersion is sheared at varying rates. If dispersion viscosity is independent of shear rate, a uniform applied adhesive thickness can be achieved without the necessity for elaborate controls.

SUMMARY OF THE INVENTION

According to the present invention, there is provided a process for preparing an aqueous dispersion of vinyl ester polymer possessing the properties of stability, water resistance, even in the absence of a post-reactive ingredient, and a viscosity index of not greater than about 1.8. The aqueous dispersion consists essentially of dispersed vinyl ester polymer and a stabilizing amount of polyvinyl alcohol having an average residual vinyl acetate content of 5 to 7 mole percent. Polyvinyl alcohol having this vinyl acetate content may be used or polyvinyl alcohols having average vinyl acetate contents of up to about 16 mole percent may be blended to produce an average of 5 to 7 mole percent.

DESCRIPTION OF PREFERRED EMBODIMENTS

As used herein, the term "consisting essentially of" means that the named ingredients are essential; however, other ingredients which do not prevent the advantages of the invention from being realized can also be included. Thus, while the vinyl ester polymer and the polyvinyl alcohol are recited as being essential ingredients, other ingredients commonly found in vinyl ester polymer dispersions can also be included in the presently claimed dispersions. Among others, such ingredients include initiators and activators not consumed in the polymerization process, buffers, preservatives, and fillers. Also, the present dispersions can contain water-soluble surfactants. However, with the exception of small amounts of nonionic surfactants as discussed hereafter, the presence of surfactants is not ordinarily desirable, especially where a high degree of water resistance is required.

Methods of preparing vinyl ester polymer dispersions are well known and any of the customary techniques can be used; however, a preferred method is disclosed in U.S. Pat. 3,534,009 to Aleksander Beresniewicz and William H. Todd, and assigned to the assignee of the present application. The term "vinyl ester polymer dispersions" is intended to include aqueous polymer dispersions wherein the polymer contains at least about 60 weight percent of polymerized vinyl ester. While vinyl acetate is the preferred vinyl ester, other vinyl esters such as vinyl formate, vinyl propionate, vinyl butyrate as well as higher vinyl esters such as vinyl stearate and vinyl palmitate are also useful. The vinyl ester polymer can be a homopolymer of a particular vinyl ester or it can be the product of the copolymerization of a vinyl ester with another vinyl ester or with one or more additional ethylenically unsaturated copolymerizable monomers. Among others, useful additional copolymerizable monomers include acrylates such as methyl acrylate, ethyl acrylate, 2-ethylhexyl acrylate, methacrylates such as methyl methacrylate, ethyl methacrylate, 2-ethylhexyl methacrylate, carboxylic acids such as acrylic acid and methacrylic acid, other vinyl compounds such as vinyl chloride and vinylidene chloride, and olefins such as ethylene and the butenes.

Of the above copolymerizable monomers, ethylene has been found to be particularly suitable. In combination with vinyl acetate, ethylene is ordinarily copolymerized in an amount of about 5 to 40 percent by weight, and preferably 10 to 20 weight percent. A particularly useful method for preparing vinyl acetate/ethylene copolymer dispersions involves an aqueous dispersion technique wherein the polymerization is accomplished under an ethylene pressure of about 100 to 1000 p.s.i.g. and at a temperature of about 40 to 80° C. Particularly useful catalyst systems for this polymerization include persulfates or peroxides used with or without reducing agents such as bisulfites or formaldehyde sulfoxylates.

In order to prepare the present dispersions, vinyl ester polymerization is carried out in an aqueous medium containing as a protective colloid partially hydrolyzed polyvinyl alcohol, derived from polyvinyl acetate, which has an average residual vinyl acetate content of 5 to 7 mole percent. Dispersions wherein the polyvinyl alcohol contains larger average amounts of residual vinyl acetate have poor viscosity indexes and yield films with poor water resistance. The use of polyvinyl alcohols with an average residual acetate content of less than 3 mole percent result in dispersions with deficient stability. The polyvinyl alcohol can be present as a blend of two different polyvinyl alcohols, i.e., a partially hydrolyzed polyvinyl alcohol having a vinyl acetate content of from about 12 to 16 mole percent and an essentially completely hydrolyzed polyvinyl alcohol having a vinyl acetate content of from about 0.5 to 1 mole percent.

The polyvinyl alcohol content of the dispersion will generally range from about 2 to 10 percent by weight, based on the weight of the vinyl ester polymer; however, best results are obtained when the polyvinyl alcohol concentration is about 3 to 6 percent by weight.

When two different grades of polyvinyl alcohol are used as a blend, the ratio of these polyvinyl alcohols in the blend is determined by the degree of hydrolysis and the molecular weight of each grade. It is generally advantageous to produce dispersions in the viscosity range of 1000 to 3000 centipoise, as determined by a Brookfield viscometer of 60 r.p.m. The molecular weights of the polyvinyl alcohols are so chosen as to give, under given polymerization conditions, the desired emulsion viscosity. When blending the polyvinyl alcohols of two different degrees of hydrolysis, the following considerations are important:

1. The average degree of hydrolysis of the blended polyvinyl alcohol is such that about 5 to 7 mole percent of vinyl acetate is unhydrolyzed;
2. The blend should not have a substantial amount of polyvinyl alcohol containing more than about 16 mole percent of unhydrolyzed vinyl acetate.

Dispersions of the present invention have the advantages of good stability, high solids content and also the advantage that films cast from the dispersion possess good water resistance even without the use of post-additives. Solids content will range from 40 to 60 percent by weight and will usually be in the range of 55 to 60 percent. Of particular advantage is the fact that very good viscosity index values can be obtained at a high solids level, as seen in Example 4, Table I.

In the examples which follow, stability of the dispersion is judged visually by dispersion appearance, i.e., on a gritty or smooth texture and whether separate layers are visible after 6 months storage. Water resistance is determined by the Weyerhaeuser soaking under stress test. In this test, wet strength kraft paper is used to make 1-inch overlap joints. The emulsion is drawn down with a No. 20 RDS wire-wound rod on one sheet of paper, and another sheet is overlaid. The assembly is air-dried at ambient temperature for 24 hours. Then 1-inch wide strips are cut and immersed in water, at ambient temperature, with a 350-gram weight attached in a shear test. This gives a shearing force of 350 grams per square inch of the lap joint. The test is rated as "fail" if delamination occurs in less than 24 hours.

The invention can be further understood by the following examples in which parts and percentages are by weight unless otherwise indicated.

EXAMPLE 1

The following ingredients were charged into a stirred 5-gallon pressure vessel:

189 grams of an 88% hydrolyzed, low molecular weight polyvinyl alcohol,
111 grams of a 99.5% hydrolyzed, medium molecular weight polyvinyl alcohol,
both dissolved in 3300 grams of distilled water,
235 grams of a 6.1% solution of zinc formaldehyde sulfoxylate in water
3860 grams of vinyl acetate.

After closing the vessel and purging it with nitrogen, the contents were heated to 60° C. and the ethylene pressure was brought to 540 p.s.i. The polymerization was initiated by adding 60 cc. of a 0.6% $H_2O_2$ solution in water.

When the polymerization started, as indicated by observance of an exotherm, the separate continuous feeds were added to the vessel.

Feed 1

4080 grams of vinyl acetate, added over a period of 100 minutes.

Feed 2

28 grams of 88% hydrolyzed, low molecular weight, polyvinyl alcohol
111 grams of 99.5% hydrolyzed, medium molecular weight polyvinyl alcohol
37 grams of "Triton" X–100, (a nonionic surfactant, sold by Rohm & Haas Co.)

All dissolved in 2520 grams of distilled water.

This Feed 2 was added over a period of 120 minutes. Ethylene pressure was maintained at 600 p.s.i., and, by addition of initiator solution, the polymerization temperature was maintained at 60° C. The reaction exotherm died down after about 4 hours, at which time the ethylene pressure was reduced to atmospheric. At this point, the residual monomer content was about 3%. Thereafter, 100 grams of the above-identified initiator solution were added to the emulsion. After maintaining the emulsion for about 30 minutes at 40° C., the residual vinyl acetate monomer content was less than 1.0%, based on the weight of the emulsion.

The emulsion had a solids content of 56.8% with the copolymer (VAc/E) comprising 85.1% vinyl acetate and 14.9% ethylene, a Brookfield viscosity at 6 r.p.m. of 3400 cps., a Brookfield viscosity at 60 r.p.m. of 2140 and a viscosity index of 1.6. The mixture of polyvinyl alcohols (PVA) used had an average mole percent of vinyl acetate of 6.2%. Stability of the emulsion was rated good and the water resistance of a film cast from the emulsion was rated very good.

EXAMPLES 2 TO 5

Following the procedure of Example 1, various emulsions were prepared containing a copolymer of 86% vinyl acetate and 14% ethylene, and also varying grades and amounts of polyvinyl alcohol. The copolymers of Examples 2, 3 and $C_3$ contained 0.07, 0.05 and 0.06%, respectively, of sodium vinyl sulfonate interpolymerized therein. In Example 6 the general procedure of Example 1 was repeated except that a single polyvinyl alcohol having an average residual vinyl acetate content of about 6.1 mole percent was used.

The emulsions and their properties are shown in Table I which follows:

TABLE I.—BLENDS OF POLYVINYL ALCOHOLS OF VARYING RESIDUAL VINYL ACETATE CONTENT IN VINYL ACETATE/ETHYLENE COPOLYMER EMULSIONS AND THE EFFECT ON STABILITY AND CAST FILM WATER RESISTANCE

| | Wt. percent based on the VAc/E copolymer | | | | | | | | | | | | Emulsion Properties | | | | | |
|---|---|---|---|---|---|---|---|---|---|---|---|---|---|---|---|---|---|---|
| | Polyvinyl alcohol with the following mole percent of residual VAc | | | | | | | | | Sodium vinyl sulfonate | Surfactant | Average mole percent VAc in the PVA | Wt. percent solids | Brookfield viscosity at— | | | Stability | Water resistance of film*** |
| Ex. | 17 | 15 | 12 | 0.1 | 5.5 | 3.8 | 2.0 | 1.0 | 0.5 | | | | | 6 r.p.m. | 60 r.p.m. | R=η6/η60 | | |
| $C_1$ | | | 5.0 | | | | | | | | | 12.0 | 55.0 | 3,650 | 1,400 | 2.4 | V. good | Poor. |
| 2 | | | 3.5 | | | | | | 2.9 | 0.07 | | 6.8 | 54.9 | 2,750 | 1,550 | 1.8 | Poor | V. good. |
| 3 | | | 2.2 | | | | 0.7 | | 2.0 | 0.05 | | 5.9 | 55.8 | 1,400 | 980 | 1.4 | Fair | Good. |
| $C_2$ | | | 1.5 | | | | 2.0 | 1.0 | | | *0.2 | 4.6 | 56.5 | 706 | 700 | 1.0 | do | V. good. |
| $C_3$ | | | 1.0 | | | | 1.0 | 3.0 | | 0.06 | | 3.7 | 59.5 | 1,300 | 1,200 | 1.1 | V. poor | Good. |
| $C_4$ | | | 1.0 | | | | 2.0 | 2.0 | | | *1.4 | 3.6 | 57.2 | 1,360 | 1,300 | 1.0 | Good | Do. |
| $C_5$ | 1.5 | | | | | | | 3.5 | | | | 5.8 | 53.1 | 520 | 400 | 1.3 | Poor | Poor. |
| 4 | | 1.3 | | | | | | 3.7 | | | | 5.9 | 59.8 | 1,600 | 1,060 | 1.5 | Good | Good. |
| $C_6$ | | | | 2.0 | | 3.0 | | | | | | 4.7 | 56.5 | 3,200 | 2,500 | 1.3 | V. poor | Not tested. |
| 5 | | | | 2.0 | 3.0 | | | | | | | 5.8 | 56.8 | 6,600 | 3,720 | 1.8 | Good | Good. |
| $C_7$ | | | 1.5 | | | | 1.5 | 1.0 | | | **0.5 | 4.0 | 58.0 | | 900 | | do | Poor. |
| 6 | | | | 5.0 | | | | | | | | 6.1 | 56.5 | 6,600 | 3,720 | 1.8 | do | Good. |

*"Triton" X-100—a nonionic surfactant, octyl phenoxy polyethoxy ethanol, manufactured by Rohm and Haas Co.
**"Aerosol" MA-80—an anionic surfactant, sodium dihexylsulfosuccinate, manufactured by American Cyanamid.
***Poor—delaminated in a few hours. Good—passed the required 24 hours; V. good—passed over 65 hours.

Control $C_1$ shows the results obtained with a typical vinyl acetate based emulsion containing an 88% hydrolyzed polyvinyl alcohol as a protective colloid. Examples 2 and 3 show that stability falls off when too much fully hydrolyzed (0.5 mole percent vinyl acetate) polyvinyl alcohol is used; however, in this latter case, a nonionic surfactant helps stability as shown in Example 1. In Control $C_4$, results are good but too much undesirable surfactant is needed. Control $C_7$ shows that a readily water-soluble anionic surfactant helps stability, but adversely affects water resistance. Examples 4 and 5 and Controls $C_5$ and $C_6$ show that the average mole percent of vinyl acetate in the polyvinyl alcohol must be carefully chosen, e.g., in $C_5$ one of the polyvinyl alcohols used had a too low degree of hydrolysis, and this affects both stability and water resistance. Example 5 shows that it is not necessary to mix two grades of polyvinyl alcohol with extremes in unhydrolyzed vinyl acetate to get good stability and water resistance. Example 6 shows that good results are obtained by utilizing a single polyvinyl alcohol rather than a blend.

I claim:

1. A process for preparing a stabilized aqueous dispersion of a vinyl ester polymer, said dispersion having a viscosity index of not greater than about 1.8, comprising copolymerizing, in an aqueous medium, vinyl ester and ethylene in the presence of partially hydrolyzed polyvinyl alcohol derived from polyvinyl acetate, said polyvinyl alcohol having an average vinyl acetate content of about 5 to 7 mole percent and consisting essentially of polyvinyl alcohol molecules containing no less than about 0.5 mole percent nor more than about 16 mole percent vinyl acetate, said polyvinyl alcohol being present in the amount of about 2 to 10 weight percent based on the weight of the vinyl ester.

2. The process of claim 1 wherein the vinyl ester is vinyl acetate.

3. The process of claim 1 wherein the polyvinyl alcohol is a blend of two or more polyvinyl alcohols each of which has an average vinyl acetate outside the range of 5 to 7 mole percent but within the range of 0.5 to 16 mole percent.

4. The process of claim 3 wherein the polyvinyl alcohol is comprised of a blend of polyvinyl alcohol having a vinyl acetate content of about 0.5 to 1 mole percent and polyvinyl alcohol having a vinyl acetate content of about 12 to 16 mole percent.

5. The dispersion produced by the process of claim 1.

6. The dispersion produced by the process of claim 3.

References Cited

UNITED STATES PATENTS

| | | | |
|---|---|---|---|
| 3,532,658 | 10/1970 | Gintz | 260—29.6 R |
| 3,010,929 | 11/1961 | Jones | 260—29.6 |
| 3,094,500 | 6/1963 | Merman | 260—29.6 |
| 3,197,429 | 7/1965 | Baatz | 260—29.6 |
| 3,213,051 | 10/1965 | Pierce | 260—29.6 |
| 3,634,349 | 1/1972 | Goi et al. | 260—17 |
| 3,644,257 | 2/1972 | Nickerson et al. | 260—29.6 WB |
| 3,661,696 | 5/1972 | Knutson | 161—204 |

OTHER REFERENCES

Skeist, "Handbook of Adhesives," pp. 371–2 Van Nostrand-Reinhold 1962.

WILLIAM SHORT, Primary Examiner

E. A. NIELSEN, Assistant Examiner

U.S. Cl. X.R.

156—332; 260—29.6 WB